United States Patent
Furusawa et al.

(10) Patent No.: US 9,539,863 B2
(45) Date of Patent: Jan. 10, 2017

(54) PNEUMATIC TIRE

(71) Applicant: The Yokohama Rubber Co., LTD., Minato-ku, Tokyo (JP)

(72) Inventors: Hiroshi Furusawa, Hiratsuka (JP); Masaaki Nagayasu, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 783 days.

(21) Appl. No.: 13/679,797

(22) Filed: Nov. 16, 2012

(65) Prior Publication Data
US 2013/0133799 A1   May 30, 2013

(30) Foreign Application Priority Data

Nov. 28, 2011 (JP) ................................ 2011-259412

(51) Int. Cl.
*B60C 11/12* (2006.01)
*B60C 11/11* (2006.01)

(52) U.S. Cl.
CPC ............. *B60C 11/12* (2013.01); *B60C 11/11* (2013.01); *B60C 11/1218* (2013.04); *B60C 11/1263* (2013.04); *B60C 2011/129* (2013.04); *B60C 2011/1209* (2013.04); *B60C 2011/1213* (2013.04); *B60C 2011/1227* (2013.04); *B60C 2011/1254* (2013.04)

(58) Field of Classification Search
CPC ............. B60C 11/1204; B60C 11/1218; B60C 11/1263; B60C 2011/1213
See application file for complete search history.

(56) References Cited

U.S. PATENT DOCUMENTS

| | | | |
|---|---|---|---|
| 5,814,169 A * | 9/1998 | Yamaguchi et al. | 152/209.22 |
| 6,408,911 B1 * | 6/2002 | Tanabe et al. | 152/209.5 |
| 2002/0139164 A1 * | 10/2002 | Ishihara | 72/326 |
| 2009/0078351 A1 * | 3/2009 | Ebiko | 152/209.23 |
| 2011/0277896 A1 * | 11/2011 | Nagayasu | B60C 11/1218 152/209.18 |

(Continued)

FOREIGN PATENT DOCUMENTS

| | | |
|---|---|---|
| DE | 10 2011 083 748 | 7/2012 |
| EP | 1 375 198 | 1/2004 |

(Continued)

OTHER PUBLICATIONS

English machine translation of JP2006-070524, dated Mar. 2006.*
English machine translation of JP2002-103921, dated Apr. 2002.*

*Primary Examiner* — Steven D Maki
*Assistant Examiner* — Robert Dye
(74) *Attorney, Agent, or Firm* — Thorpe North & Western

(57) ABSTRACT

In a pneumatic tire, a single block includes a first sipe and a second sipe each extending in a tire width direction and disposed at a predetermined pitch in a tire circumferential direction. The first sipe and the second sipe include a first sipe portion that has a linear form when the block is viewed planarly, and a second sipe portion that has a zigzag shape when the block is viewed planarly and that connects to the first sipe portion. The first sipe portion includes a pair of sipe wall faces that face each other and have a linear form when viewed as a cross-section from a direction perpendicular to a sipe length direction, and includes a protrusion disposed on a first face of the sipe wall faces and a recess disposed on a second face of the sipe wall faces so as to mate with the protrusion.

18 Claims, 14 Drawing Sheets

(56) References Cited

U.S. PATENT DOCUMENTS

2012/0180920 A1    7/2012  Nagayasu

FOREIGN PATENT DOCUMENTS

| | | | |
|---|---|---|---|
| JP | 05-058118 | | 3/1993 |
| JP | H11-342708 | | 12/1999 |
| JP | 2000-255219 | | 9/2000 |
| JP | 2002-103921 | * | 4/2002 |
| JP | 2003-320815 | | 11/2003 |
| JP | 2006-070524 | * | 3/2006 |
| JP | 2010-064699 | | 3/2010 |
| JP | 2010-260416 | | 11/2010 |
| WO | WO99/48707 | * | 9/1999 |

* cited by examiner

| | Conventional Example | Comparative Example 1 | Comparative Example 2 | Working Example 1 | Working Example 2 | Working Example 3 | Working Example 4 | Working Example 5 |
|---|---|---|---|---|---|---|---|---|
| Sipe form | FIG. 19 (without protrusions or recesses) | FIG. 20 (without protrusions or recesses) | FIGs. 4, 5 (without protrusions or recesses) | FIGs. 4, 5 | FIGs. 4, 5 | FIGs. 4, 5 | FIGs. 4, 5 | FIGs. 4, 5 |
| Second sipe portion | Three-dimensional form | Three-dimensional form | Three-dimensional form | Three-dimensional form | Three-dimensional form | Three-dimensional form | Three-dimensional form | Three-dimensional form |
| D2/D1 | - | - | 0.25 | 0.25 | 0.15 | 0.40 | 0.30 | 0.30 |
| NA/NB | - | - | - | 3/2 | 3/2 | 3/2 | 1/4 | 3/2 |
| H(H1, H2) [mm] | - | - | - | 1.0 | 1.0 | 1.0 | 1.0 | 0.7 |
| L [mm] | 3 | 3 | 3 | 3 | 3 | 3 | 3 | 3 |
| P/Hb | 0.6 | 0.6 | 0.6 | 0.6 | 0.6 | 0.6 | 0.6 | 0.6 |
| Steering stability on snow | 100 | 90 | 95 | 105 | 107 | 102 | 100 | 100 |
| Braking ability on ice (when new) | 100 | 90 | 95 | 110 | 108 | 107 | 110 | 106 |
| Braking ability on ice (when 50% worn) | 100 | 107 | 103 | 115 | 108 | 110 | 110 | 108 |

FIG. 18a

|  | Working Example 6 | Working Example 7 | Working Example 8 | Working Example 9 | Working Example 10 | Working Example 11 | Working Example 12 |
|---|---|---|---|---|---|---|---|
| Sipe form | FIGs. 4, 5 | FIGs. 4, 5 | FIGs. 4, 5 | FIGs. 4, 5 | FIGs. 4, 5 | - | FIGs. 16, 17 |
| Second sipe portion | Three-dimensional form | Three-dimensional form | Three-dimensional form | Three-dimensional form | Three-dimensional form | Two-dimensional form | Three-dimensional form |
| D2/D1 | 0.30 | 0.30 | 0.30 | 0.30 | 0.30 | 0.30 | 0 (without third sipe portion) |
| NA/NB | 3/2 | 3/2 | 3/2 | 3/2 | 3/2 | 3/2 | 3/2 |
| H(H1, H2) [mm] | 2.0 | 1.0 | 1.0 | 1.0 | 1.0 | 1.0 | 1.0 |
| L [mm] | 3 | 2 | 4 | 3 | 3 | 3 | 3 |
| P/Hb | 0.6 | 0.6 | 0.6 | 0.5 | 0.8 | 0.6 | 0.6 |
| Steering stability on snow | 103 | 102 | 103 | 102 | 107 | 97 | 102 |
| Braking ability on ice (when new) | 107 | 112 | 108 | 112 | 108 | 105 | 105 |
| Braking ability on ice (when 50% worn) | 112 | 108 | 107 | 116 | 110 | 107 | 106 |

FIG. 18b

PNEUMATIC TIRE

PRIORITY CLAIM

Priority is claimed to Japan Patent Application Serial No. 2011-259412 filed on Nov. 28, 2011.

BACKGROUND

Technical Field

The present technology relates to a pneumatic tire and particularly relates to a pneumatic tire whereby steering stability on snow of the tire can be enhanced.

Related Art

In a studless tire, a water film removing action on an icy surface is generated by disposing a plurality of sipes on a road contact surface of blocks, thereby improving braking ability on ice of the tire. The technologies described in Japanese Unexamined Patent Application Publication No. 2010-64699A and Japanese Patent No. 3180160 are known as a conventional pneumatic tire using such a configuration.

However, there is a problem in that steering stability on snow of the pneumatic tires needs to be improved.

SUMMARY

The present technology provides a pneumatic tire whereby steering stability on snow can be improved. A pneumatic tire includes a plurality of circumferential main grooves extending in a tire circumferential direction, a plurality of lug grooves extending in a tire width direction, and blocks partitioned by the plurality of circumferential main grooves and the plurality of lug grooves. The blocks include a first sipe and a second sipe, each extending in the tire width direction and disposed at a predetermined pitch in the tire circumferential direction. The first sipe and the second sipe each include a first sipe portion having a linear form when the block is viewed planarly, and a second sipe portion having a zigzag shape when the block is viewed planarly and that connects to the first sipe portion. The first sipe portion includes a pair of sipe wall faces that face each other and have a linear form when viewed as a cross-section from a direction perpendicular to a sipe length direction, and includes a protrusion disposed on a first sipe wall face and a recess disposed on a second sipe wall face so as to mate with the protrusion. The first sipe portion of the first sipe opens to one of the circumferential main grooves of the left and right circumferential main grooves that partition the blocks, and the first sipe portion of the second sipe opens to the other circumferential main groove.

With the pneumatic tire according to the present technology, when the tire is in contact with the road, a first sipe portion having protrusions and recesses collapses easily, and a shallow-bottomed third sipe portion resists collapse. Here, the first sipe portion and the third sipe portion are disposed alternately in the tire circumferential direction on left and right edge portions of the blocks. Therefore, a water film removing action on icy roads is improved. Such a configuration is beneficial because water discharge properties are improved and performance on ice and snow of the tire is enhanced.

BRIEF DESCRIPTION OF THE DRAWINGS

FIGS. 18a-18b include a table showing results of performance testing of pneumatic tires according to embodiments of the present technology.

DETAILED DESCRIPTION

The present technology is explained in detail below with reference to the drawings. However, the present technology is not limited to these embodiments. Moreover, constituents of the embodiment which can possibly or obviously be substituted while maintaining consistency with the present technology are included. Furthermore, the multiple modified examples described in the embodiment can be combined as desired within the scope apparent to a person skilled in the art.

Pneumatic Tire

Figure 1:
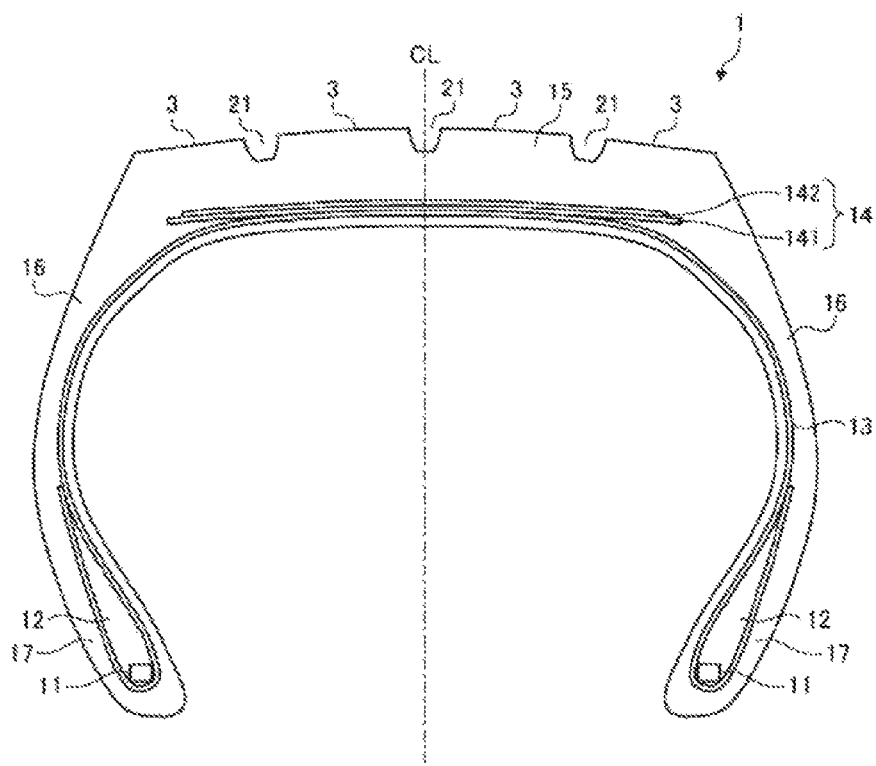
FIG. 1 is a cross-sectional view in a tire meridian direction illustrating a pneumatic tire according to an embodiment of the present technology.

FIG. 1 is a cross-sectional view in a tire meridian direction illustrating a pneumatic tire 1 according to an embodiment of the present technology. This drawing illustrates a studless tire for use on a passenger car as an example of the pneumatic tire 1. Note that the symbol CL refers to a tire equator plane.

A pneumatic tire 1 includes a pair of bead cores 11 and 11, a pair of bead fillers 12 and 12, a carcass layer 13, a belt layer 14, tread rubber 15, a pair of side wall rubbers 16 and 16, and a pair of bead rubbers 17 and 17 (see FIG. 1).

The pair of bead cores 11 and 11 has annular structures and constitutes cores of left and right bead portions. The pair of bead fillers 12 and 12 is disposed on a periphery of each of the pair of bead cores 11 and 11 in a tire radial direction so as to reinforce bead portions.

The carcass layer 13 has a single-layer structure, and stretches between the left and right bead cores 11 and 11 in toroidal form, forming a framework for the tire. Additionally, both ends of the carcass layer 13 are folded toward an outer side in the tire width direction so as to envelop the bead cores 11 and the bead fillers 12, and fixed. Also, the carcass layer 13 is constituted by a plurality of carcass cords formed from steel or organic fibers (e.g. nylon, polyester, rayon, or the like) covered by a coating rubber and subjected to a rolling process, and has a carcass angle (inclination angle of the carcass cord in a fiber direction with respect to the tire circumferential direction) with an absolute value of not less than 85° and not more than 95°.

The belt layer 14 is formed by stacking a pair of intersecting belts 141 and 142, and disposing the belts to extend over an outer circumference of the carcass layer 13. The pair of intersecting belts 141 and 142 is configured by covering a plurality of belt cords formed from steel or organic fibers covered by a coating rubber and subjected to a rolling process, and has a belt angle with an absolute value of not less than 10° and not more than 30°. Further, each of the belts of the pair of intersecting belts 141 and 142 has a belt angle (inclination angle in the fiber direction of the belt cord with respect to the tire circumferential direction) denoted with a mutually different symbol, and the belts are stacked so as to intersect each other in the belt cord fiber directions (crossply configuration).

The tread rubber 15 is disposed on the periphery of the carcass layer 13 and the belt layer 14 in the tire radial direction, and forms a tire tread. The pair of side wall rubbers 16 and 16 is disposed on each outer side of the carcass layer 13 in the tire width direction, so as to form left and right side wall portions of the tire. A pair of bead rubbers 17 and 17 is disposed on each outer side of the left and right bead cores 11 and 11 and the bead fillers 12 and 12 in the tire width direction so as to form left and right bead portions of the tire.

Figure 2:
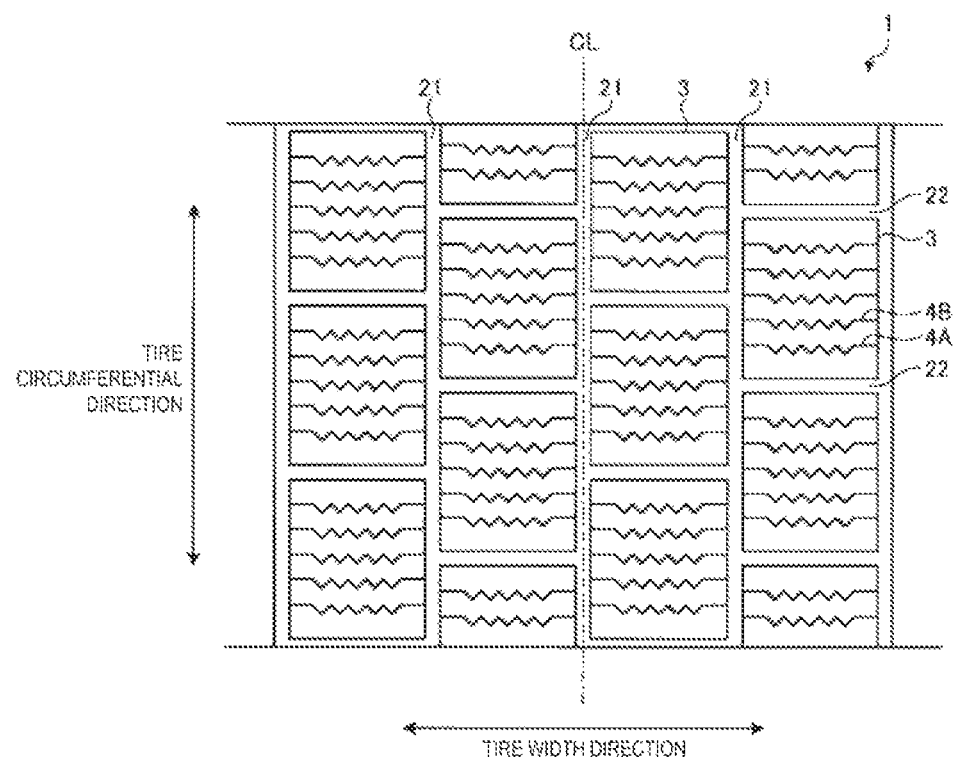
FIG. 2 is a plan view illustrating a tread surface of the pneumatic tire depicted in FIG. 1.

FIG. 2 is a plan view illustrating a tread surface of the pneumatic tire 1 depicted in FIG. 1. This drawing illustrates a typical block pattern.

The pneumatic tire 1 has a plurality of circumferential main grooves 21 extending in a tire circumferential direction, a plurality of lug grooves 22 extending in the tire width direction, and a plurality of blocks 3 partitioned by the circumferential main grooves 21 and the lug grooves 22 in the tread portion (see FIG. 2).

For example, in this embodiment, three of the circumferential main grooves 21 having a straight form are disposed so as to be left-right symmetrical around the tire equator plane CL. Also, the plurality of lug grooves 22 is disposed at a predetermined pitch in the tire circumferential direction, and opens to the circumferential main grooves 21. The circumferential main grooves 21 and the lug grooves 22 thus form a block pattern having four rows of blocks.

Figure 3:
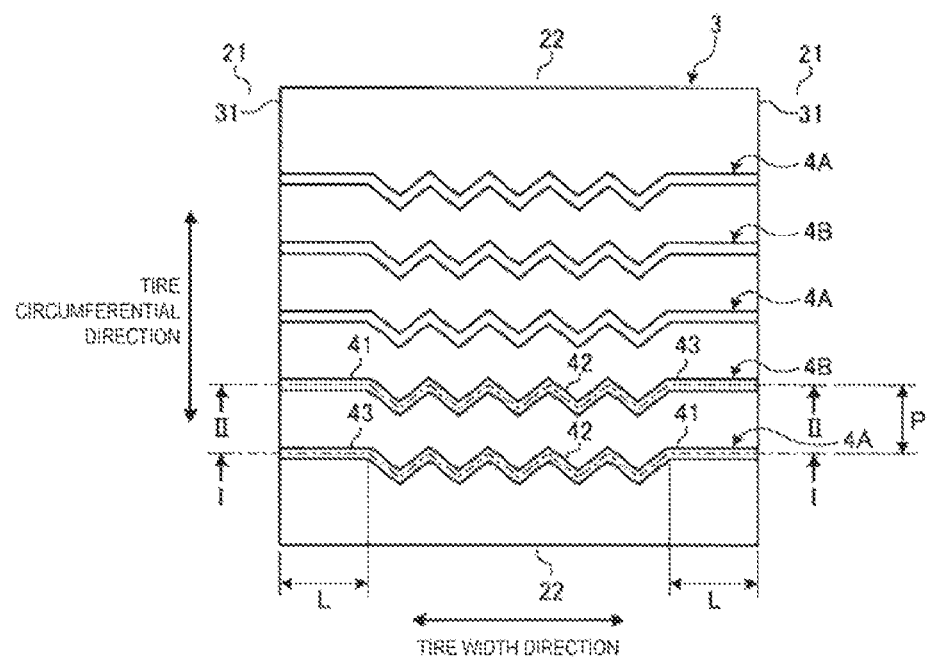
FIG. 3 is a plan view illustrating a block of the pneumatic tire depicted in FIG. 1.
Figure 4:
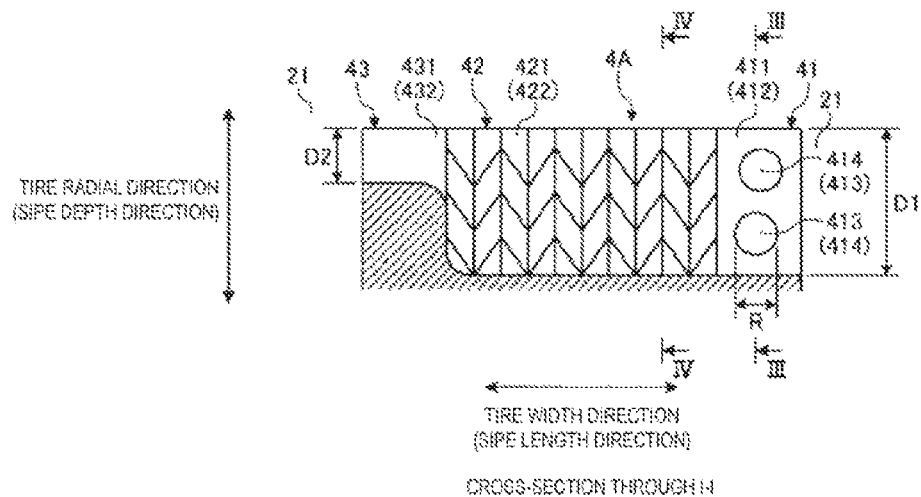
FIG. 4 is a cross-sectional view taken along line I-I, illustrating a sipe of the block depicted in FIG. 3.
Figure 5:
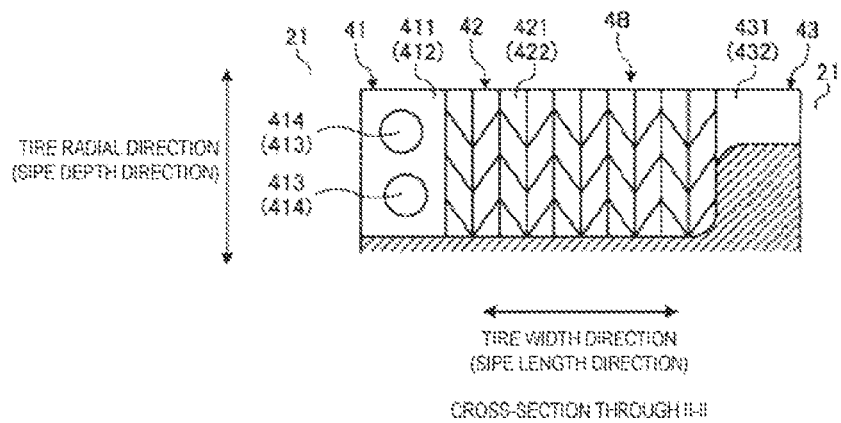
FIG. 5 is a cross-sectional view taken along line II-II, illustrating the sipe of the block depicted in FIG. 3.
Figure 6:
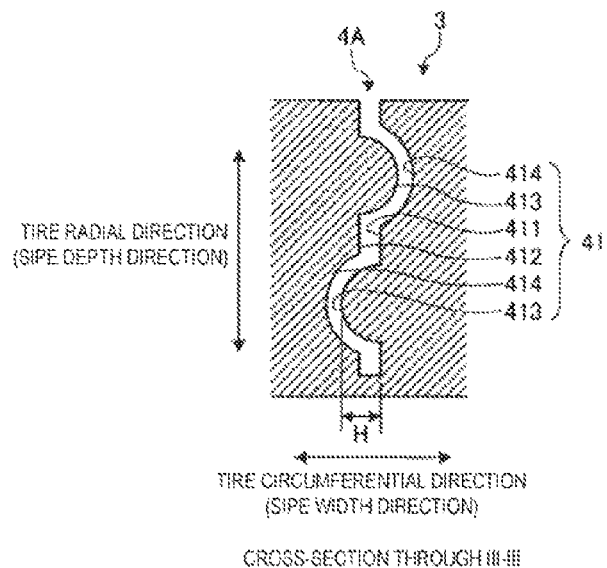
FIG. 6 is a cross-sectional view taken along line III-III, illustrating the sipe depicted in FIG. 4.
Figure 7:
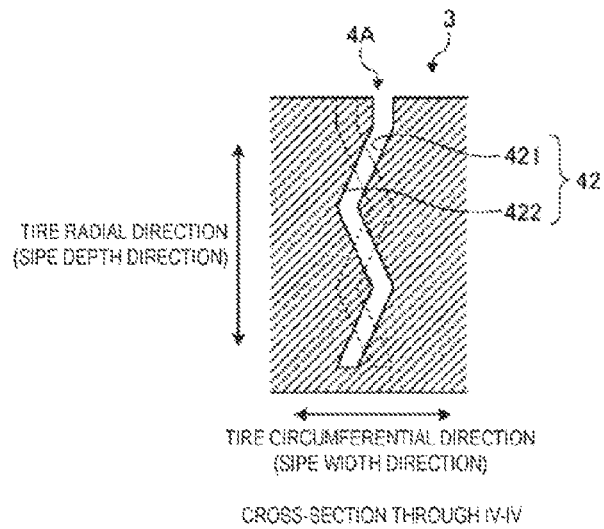
FIG. 7 is a cross-sectional view taken along line IV-IV, illustrating the sipe depicted in FIG. 4.

Note that "circumferential main grooves" refers to circumferential grooves having a groove width of 3.5 mm or greater. Moreover, "lug grooves" refers to lateral grooves having a groove width of 2.0 mm or greater. Note that, hereinafter, "sipe" refers to a cut formed in a land portion with a sipe width of less than 1.0 mm Structure of the Sipes of the Blocks FIG. 3 is a plan view illustrating a block 3 of the pneumatic tire 1 depicted in FIG. 1. FIGS. 4 and 5 are cross-sectional views taken along line I-I (FIG. 4) illustrating sipe 4A of the block 3 depicted in FIG. 3 and line II-II (FIG. 5) illustrating sipes 4B of the block 3 depicted in FIG. 3, respectively. FIGS. 6 and 7 are cross-sectional views taken along line III-III (FIG. 6) and line IV-IV (FIG. 7) illustrating the sipes 4A depicted in FIG. 4. Among these drawings, FIG. 3 illustrates the block 3 alone. FIG. 4 is a drawing when sipe wall faces of the sipes 4A are viewed planarly, and FIG. 5 is a drawing when sipe wall faces of sipes 4B are viewed planarly. FIG. 6 is a cross-sectional view of the first sipe portion 41 of the sipes 4A, and FIG. 7 is cross-sectional view of the second sipe portion 42 of the sipes 4A.

In the pneumatic tire 1, a single block 3 has a plurality of sipes 4A and 4B (see FIG. 3). The sipes 4A and 4B each extend in the tire width direction, and are disposed at a predetermined pitch in the tire circumferential direction.

For example, in the configuration of FIG. 3, the single block 3 includes five of the sipes 4A and 4B. Also, the sipes 4A and 4B are open sipes that extend in the tire width direction of the blocks 3 so as to cross the blocks, and open to left and right circumferential main grooves 21 and 21 that partition the block 3. Additionally, the sipes 4A and 4B are arranged so as to be mutually parallel and have a predetermined spacing in the tire circumferential direction.

Further, each of the sipes 4A and 4B includes the first sipe portion 41, the second sipe portion 42, and the third sipe portion 43, and is configured with the sipe portions 41 to 43 connected in the stated order (see FIG. 3).

The first sipe portion 41 has a linear form when the block 3 is viewed planarly and is disposed at an edge portion 31 of the block 3, opening to the circumferential main groove 21. The second sipe portion 42 has a zigzag shape when the block 3 is viewed planarly and is disposed at a central portion of the block 3. The third sipe portion 43 has a linear form when the block 3 is viewed planarly and opens to the circumferential main groove 21 that is on a side opposite the circumferential main groove 21 to which the first sipe portion 41 opens.

The first sipe portion 41 has a pair of first sipe wall faces 411 and 412, a protrusion 413, and a recess 414 (see FIGS. 4 and 5). The pair of first sipe wall faces 411 and 412 has a linear form when viewed as a cross-section from a direction perpendicular to a sipe length direction, and these are disposed so as to be mutually opposing. The protrusion 413 and the recess 414 are disposed, respectively, on the opposing first sipe wall faces 411 and 412 so as to mutually mate.

For example, in the configuration of FIG. 4, the single first sipe portion 41 includes a pair of first sipe wall faces 411 and 412, and two sets of the protrusion 413 and recess 414. Moreover, when the sipe wall face is viewed planarly, the first sipe wall face 411 (412) has a planar form, and the recess 414 (protrusion 413) of the first set and the protrusion 413 (recess 414) of the second set are disposed so as to be in a line in the sipe depth direction on the first sipe wall face 411 (412). Thus, each of the protrusion 413 and the recess 414 is disposed on both a road contact surface side and a sipe bottom side of the blocks.

Furthermore, as illustrated in FIG. 6, when viewed as a cross-section from a direction perpendicular to the sipe length direction, the sipes 4A extend from the road contact surface of the blocks 3 in the tire radial direction. Additionally, the pair of first sipe wall faces 411 and 412 has a planar form, and extends perpendicular to the road contact surface of the blocks 3. Moreover, the protrusion 413 and the recess 414 are disposed on each of the first sipe wall faces 411 and 412. Here, the protrusion 413 is formed on a first face of the first sipe wall faces 411 and the recess 414 is formed at a position opposite the protrusion 413 in a second face of the first sipe wall faces 412. Additionally, as described above, two sets of the protrusion 413 and the recess 414 are disposed so as to be in line in the sipe depth direction.

Also, as illustrated in FIG. 7, the second sipe portion 42 includes the pair of second sipe wall faces 421 and 422. The second sipe wall faces 421 and 422 have a form that is bent in the sipe width direction when viewed as a cross-section from a direction perpendicular to the sipe length direction, and are mutually opposing so as to mate. Note that the sipe portions having three-dimensional sipe wall faces will be referred to as a three-dimensional form.

For example, in the configurations of FIG. 3 and FIG. 6, when the tread portion is viewed planarly, the second sipe portion 42 has a zigzag shape extending in the tire width direction while oscillating in the tire circumferential direction (see FIG. 3). When viewed as a cross-section from a direction perpendicular to the sipe length direction, the second sipe portion 42 has a zigzag shape extending in the sipe depth direction while oscillating in the sipe width direction (see FIG. 6). Moreover, the opposing second sipe wall faces 421 and 422 bend in the same direction and, as a result, have a mutually mating form. Furthermore, in the second sipe portion 42, an angle of inclination of the second sipe wall faces 421 and 422 varies along the sipe length direction and, as a result, a three-dimensional wall face form is formed.

The third sipe portion 43 has a pair of third sipe wall faces 431 and 432 (see FIGS. 4 and 5). The pair of third sipe wall faces 431 and 432 has a linear form when viewed as a cross-section from a direction perpendicular to the sipe length direction, and these are disposed so as to be mutually opposing. Also, the third sipe portion 43 has a shallower bottom configuration than the first sipe portion 41. Specifically, a sipe depth D1 of the first sipe portion 41 and a sipe depth D2 of the third sipe portion 43 have a relationship such that D2/D1≤0.5. Note that the sipe portions having planar sipe wall faces will be referred to as two-dimensional sipe portions (planar sipe portions).

Each of the sipes 4A and 4B is classified as a first sipe 4A or a second sipe 4B.

As illustrated in FIGS. 3 to 5, the first sipe 4A and the second sipe 4B have similar configurations, differing only in being symmetrically disposed with respect to the single block 3. Specifically, the first sipe portion 41 of the first sipe 4A opens to one of the left and right circumferential main grooves 21 that partition the block 3, and the second sipe portion 42 of the second sipe 4B opens to the other of the circumferential main grooves 21. Therefore, the protrusion 413 and the recess 414 of the first sipe 4A and the protrusion 413 and the recess 414 of the second sipe 4B are disposed at the edge portions 31 and 31 on mutually different sides within the block 3, respectively.

For example, in the configuration of FIG. 3, the block 3 has a total of five sipes 4A and 4B with the first sipe 4A and the second sipe 4B being disposed alternately in the tire circumferential direction. Therefore, the first sipe portion 41 including the protrusion 413 and the recess 414 is disposed alternately on the left and right edge portions 31 and 31 of the block 3 in the tire circumferential direction. At the same time, the shallow third sipe portion 43 is disposed alternately on the right and left edge portions 31 and 31 of the block 3 in the tire circumferential direction.

Figure 8:
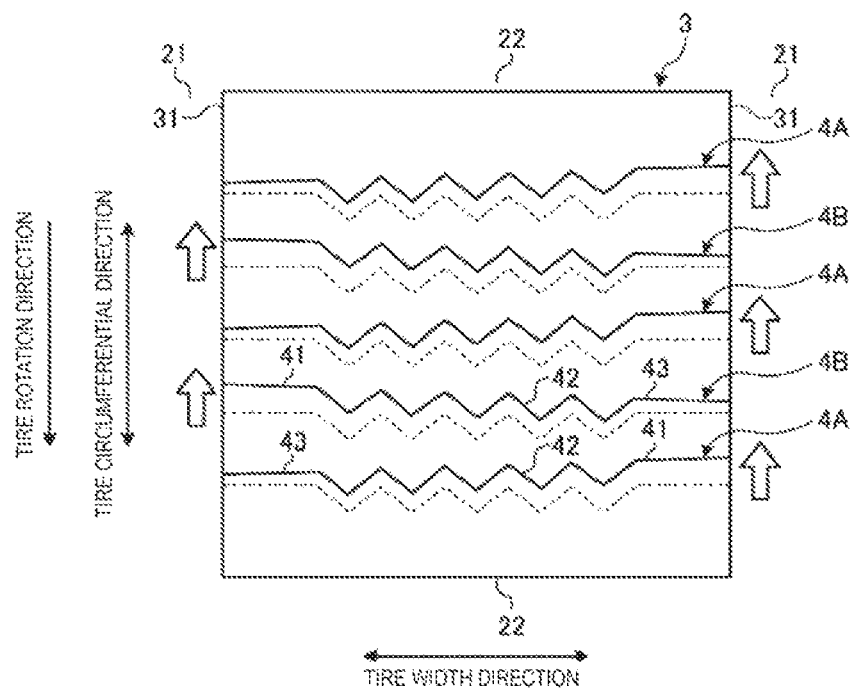
FIG. 8 is an explanatory view illustrating the effect of the pneumatic tire depicted in FIG. 1.

FIG. 8 is an explanatory drawing illustrating the effect of the pneumatic tire 1 depicted in FIG. 1. This drawing illustrates the sipes 4A and 4B of the block 3 when the tire is in contact with the ground.

In the pneumatic tire 1, the blocks 3 have a plurality of the sipes 4A and 4B and, as a result, the edge components of the blocks 3 are increased and performance on ice and performance on snow of the tire are enhanced. Additionally, when ground contact pressure acts on the blocks 3 when the tire is rotating, the sipes 4A and 4B close, and the protrusion 413 and recess 414 of the first sipe portion 41 and the second sipe wall faces 421 and 422 of the second sipe portion 42 each mate (not illustrated). As a result, collapsing of the block 3 is suppressed, the rigidity of the block 3 is ensured and the steering stability of the tire is increased.

Also, when the tire is in contact with the ground, the first sipe portion 41 including the protrusion 413 and the recess 414 collapses easily, while the shallow-bottomed third sipe portion 43 resists collapse (see FIG. 8). Here, the first sipe portion 41 and the third sipe portion 43 are disposed alternately in the tire circumferential direction on the left and right edge portions 31 and 31 of the block 3. Therefore, the water film removing action (action of removing the water film on the road contact surface of the block) on icy roads is enhanced. As result, the water discharge properties are improved, and the performance on ice and performance on snow (steering stability on snow and braking ability on ice) of the tire are improved.

Note that in the configuration of FIG. 3, the first sipe 4A and the second sipe 4B are disposed alternately in the tire circumferential direction. However, the configuration is not limited thereto, and the plurality of first sipes 4A (or the plurality of second sipes 4B) may be disposed so as to be adjacent to one another. In such a case, it is preferable that at least one of the first sipe 4A and the second sipe 4B are included in every four adjacent sipes. Accordingly, a number of the first sipes 4A (or second sipes 4B) that are disposed so as to be adjacent each other will be two or three.

In this case, it is also preferable that a number NA of the first sipes 4A and a number NB of the second sipes 4B in the single block 3 satisfy a relationship such that $0.25 \leq NA/NB \leq 0.75$. As a result, the number of the first sipe portions 41 (sipe portions having the protrusion 413 and the recess 414) disposed in the left and right edge portions 31 and 31 of the block 3 is balanced.

Also, in the configuration of FIG. 3, all the sipes disposed in the single block 3 are configured from the first sipe 4A and the second sipe 4B. Note, however, that the present technology is not limited to such a configuration, and other sipes may be disposed within the block 3 (not illustrated in the drawings). For example, in the configuration of FIG. 3, a portion of the first sipes 4A and second sipes 4B could be replaced with another type of sipe. In such a case, it is preferable that not less than 50% and not more than 100% (more preferably not less than 80% and not more than 100%) of the total number of sipes in the single block 3 are configured from the first sipe 4A and the second sipe 4B.

Further, in the configuration of FIG. 3, it is preferable that a disposal pitch P between the first sipe 4A and the second sipe 4B (see FIG. 3) and a height Hb (not illustrated in the drawings) of the block 3 satisfy a relationship such that $0.3 \leq P/Hb \leq 1.0$, and it is more preferable that the disposal pitch P and the height Hb satisfy a relationship such that $0.5 \leq P/Hb \leq 0.8$. Note that the height Hb of the block 3 refers to a maximum groove depth of the left and right circumferential main grooves 21 and 21 that partition the block 3.

Modified Examples of the First Sipe Portion

FIGS. 9 to 12 are explanatory views illustrating modified examples of the pneumatic tire 1 depicted in FIG. 1. These drawings illustrate modified examples of the first sipe portion 41.

In the configurations of FIGS. 4 to 6, the first sipe portion 41 has two sets of the protrusion 413 and the recess 414. The protrusions 413 and recesses 414 are disposed so as to be in a line in the sipe depth direction on the first sipe wall faces 411 and 412. Here, one of each of the protrusion 413 and the recess 414 is disposed in the first face of the first sipe wall faces 411, and one of each of the recess 414 and the protrusion 413, respectively corresponding thereto, is disposed in the second face of the first sipe wall faces 412. In other words, the first face of the first sipe wall face 411 of the first sipe portion 41 includes at least one of each of the protrusion 413 and the recess 414.

Figure 9:
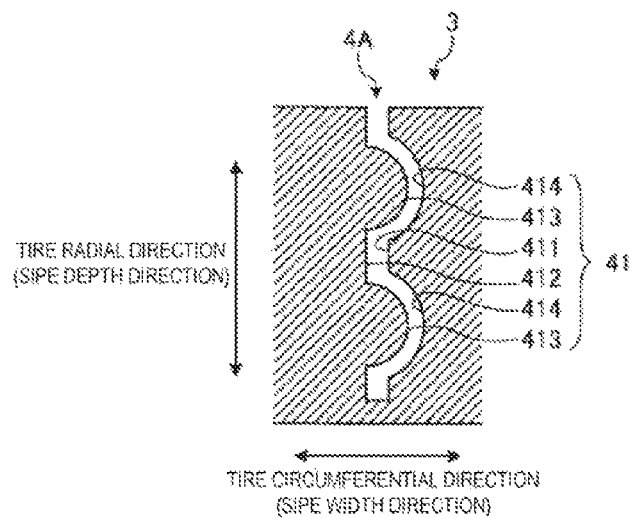
FIG. 9 is an explanatory view illustrating a modified example of the pneumatic tire depicted in FIG. 1.

However, the present technology is not limited to such a configuration. As illustrated in FIG. 9, two of the protrusions 413 and 413 may be disposed in the first face of the first sipe wall faces 412 and two of the recesses 414 and 414 may be disposed in the second face of the first sipe wall faces 411. In other words, only the protrusion 413 (or only the recess 414) may be disposed disproportionately in one of the faces of the first sipe wall faces 411.

Figure 10:
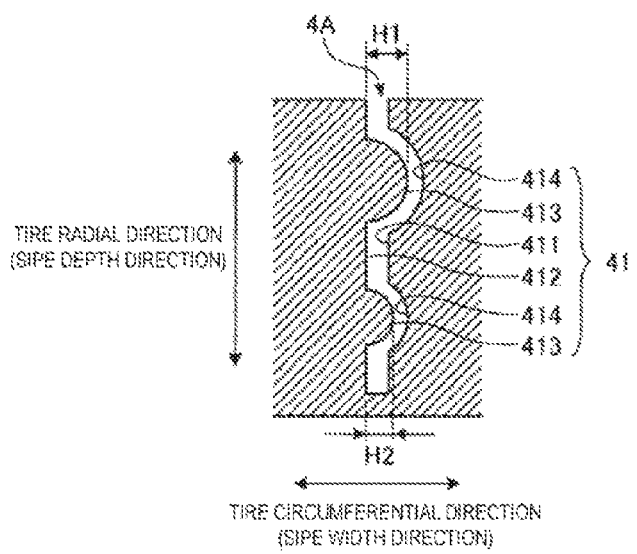
FIG. 10 is an explanatory view illustrating a modified example of the pneumatic tire depicted in FIG. 1.

Additionally, in the configurations of FIG. 6 and FIG. 9, a height H of the protrusion 413 on the block road contact surface side and a height H of the protrusion 413 on the sipe bottom side are set so as to be the same. However, the present technology is not limited to such a configuration, and as illustrated in FIG. 10, a height H1 of the protrusion 413 on the block road contact surface side may be set so as to be greater than a height H2 of the protrusion 413 on the sipe bottom side (H1>H2). With such a configuration, the mating force of the protrusion 413 and the recess 414 on the block road contact surface side will be great. Thereby, block rigidity of the road contact surface side, where collapsing is prone to occur, can be effectively reinforced.

Additionally, a height H (H1 and H2) of the protrusion 413 is preferably in a range 0.5 mm≤H≤3.0 mm Additionally, in the configuration of FIG. 4, a diameter R of the protrusion 413 of the first sipe portion 41 is preferably in a range 1 mm≤R≤4 mm As a result, the protrusion 413 and the recess 414 will mate properly and, thus, braking ability on ice of the tire will be enhanced.

Figure 11:
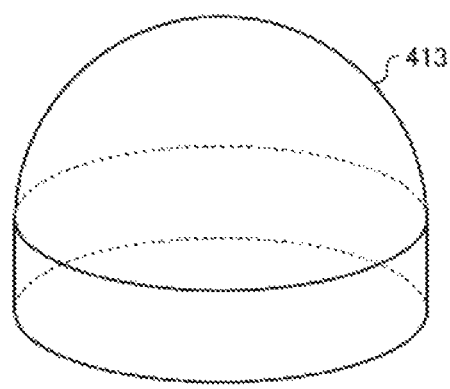
FIG. 11 is an explanatory view illustrating a modified example of the pneumatic tire depicted in FIG. 1.
Figure 12:
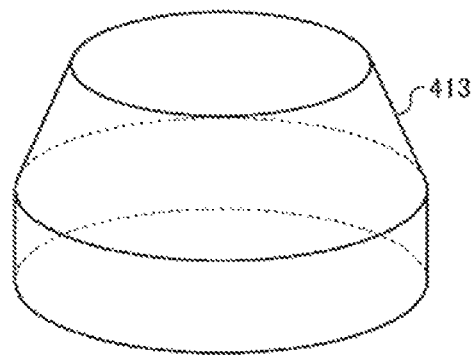
FIG. 12 is an explanatory view illustrating a modified example of the pneumatic tire depicted in FIG. 1.

Also, in the configurations of FIGS. 4 to 6, the protrusion 413 of the first sipe portion 41 has a hemispherical form. Furthermore, the recess 414 has a hemispherical form that matches the protrusion 413. However, the present technology is not limited to such a configuration, and the protrusion 413 may have a semi-elliptical form or a truncated conical form (not illustrated). Additionally, as illustrated in FIGS. 11 and 12, the protrusion 413 may have a form in which a top portion on a protruding side is a hemisphere, a semi-ellipsoid, or a truncated cone; and a bottom portion is a cylinder.

Also, in the configurations of FIG. 3 to FIG. 5, the first sipe portion 41 is a two-dimensional sipe and has planar first sipe wall faces 411 and 412. Such a configuration is preferable because production of the edge form of the sipe molding die is facilitated. However, the present technology is not limited to such a configuration, and the first sipe portion 41 may be configured from a concave or convex surface (not illustrated in the drawings).

In the configurations of FIGS. 3 to 5, the first sipe portion 41 has two sets of the protrusion 413 and the recess 414 arranged in the sipe depth direction. Therefore, the protrusions 413 and the recesses 414 are arranged in a 2-level structure in the sipe depth direction. However, the present technology is not limited to such a configuration, and the first sipe portions 41 may include only a single set of the protrusion 413 and the recess 414 or three or more sets of the protrusion 413 and the recess 414.

In the configuration in which the first sipe portions 41 includes a plurality of sets of the protrusion 413 and the recess 414, it is preferable that an average distance value Dd from the road contact surface of the block 3 to a center of gravity of the protrusion 413 and a sipe depth D1 of the first sipe portion 41 satisfy a relationship such that 0.5≤Dd/D1. Note that the center of gravity of the protrusions 413 is measured when the first sipe wall face 411 of the first sipe portion 41 is viewed planarly. The lower limit of Dd/D1 is constrained by the sipe depth and the diameter R of the protrusion 413.

Also, in the configuration of FIG. 3, it is preferable that a length L in the tire width direction of the first sipe portions 41 is in a range 1 mm≤L≤5 mm Thereby, production of the edge form of the sipe molding die is facilitated. Note that the range where the first sipe portion 41 is provided is defined by the length L.

Additionally, in the configuration of FIG. 4, it is preferable that a sipe area Sa of the first sipe portion 41 and a sum Sp of a disposal area of the protrusions 413 and the recesses 414 in the first sipe portion 41 satisfy a relationship such that 0.2≤Sp/Sa≤0.7. In other words, the protrusion 413 and the recess 414 are not disposed throughout the entire face of the first sipe portion 41. Rather, the protrusion 413 and the recess 414 are disposed partially while leaving the planar first sipe wall faces 411 (412). Thereby, the production of the edge form of the sipe molding die is facilitated while maintaining the functionality of the protrusion 413 and the recess 414. Note that the density at which the protrusion 413 and the recess 414 are disposed is defined by the ratio Sp/Sa. The sipe area Sa of the first sipe portion 41 refers to the entire area of the first sipe portion 41 that includes the protrusions 413 and the recesses 414.

Modified Examples of the Second Sipe Portion

Figure 13:
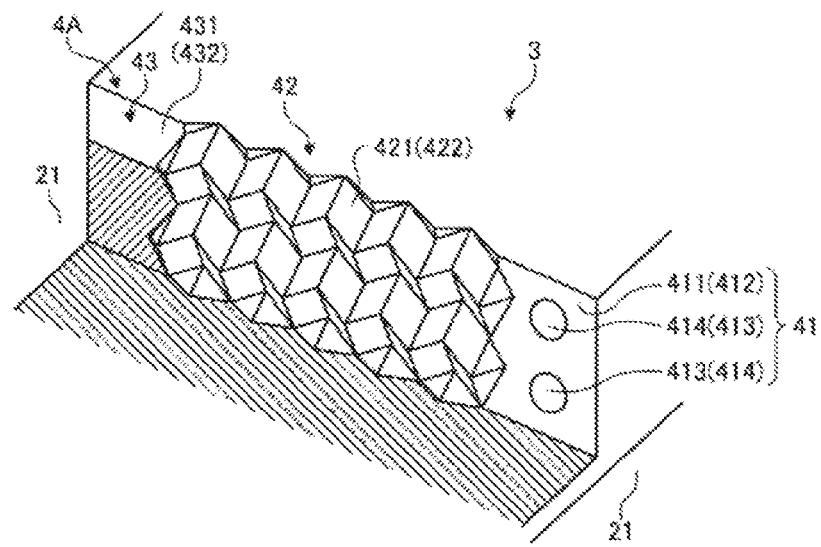
FIG. 13 is an explanatory view illustrating a modified example of the pneumatic tire depicted in FIG. 1.
Figure 14:
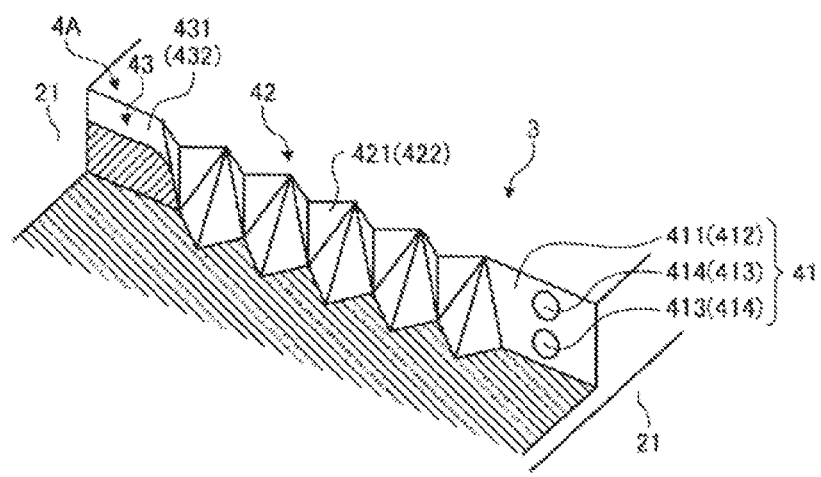
FIG. 14 is an explanatory view illustrating a modified example of the pneumatic tire depicted in FIG. 1.

FIGS. 13 and 14 are explanatory views illustrating modified examples of the pneumatic tire 1 depicted in FIG. 1. These drawings illustrate modified examples of the second sipe portion 42.

In the configurations of FIGS. 3 to 5 and FIG. 7, the second sipe portion 42 has second sipe wall faces 421 and 422 that have a three-dimensional form (a form bending in the sipe width direction when viewed as a cross-section from a direction perpendicular to the sipe length direction). Compared to the two-dimensional sipes, the three-dimensional sipes have a greater mating force between opposing sipe wall faces and, therefore, it is preferable that the three-dimensional sipes act to reinforce rigidity of the land portions. However, the present technology is not limited to such a configuration, and the second sipe wall faces 421 and 422 of the second sipe portion 42 may have a zigzag shape when the block is viewed planarly (see FIG. 3) and have a linear form when viewed as a cross-section from a direction perpendicular to the sipe length direction (not illustrated in the drawings).

Note that the configurations of FIG. 13 and FIG. 14 are examples of configurations in which the second sipe portion 42 has three-dimensional second sipe wall faces 421 and 422.

In the configuration of FIG. 13, the second sipe wall faces 421 and 422 have a structure in which pyramids and inverted pyramids are connected in the sipe length direction. In other words, the second sipe wall faces 421 and 422 are formed by mutually offsetting pitches of a zigzag form of the tread surface side and a zigzag form of the bottom side in the tire width direction so that mutually opposing protrusions and recesses are formed between the zigzag forms of the tread surface side and the bottom side. Additionally, with these protrusions and recesses, when viewed in a tire rotating direction, the second sipe wall faces 421 and 422 are formed by connecting a protrusion inflection point on the tread surface side to a recess inflection point on the bottom side, a recess inflection point on the tread surface side to a protrusion inflection point on the bottom side, and protrusion inflection points mutually adjacent to the protrusion inflection point on the tread surface side and the protrusion inflection point on the bottom side with ridge lines; and connecting these ridge lines with consecutive planes in the tire width direction. Additionally, the first face of the second sipe wall faces 421 has a corrugated surface wherein convex pyramids and inverted pyramids thereof are arranged alternating in the tire width direction; and the second face of the second sipe wall faces 422 has a corrugated surface wherein concave pyramids and inverted pyramids thereof are arranged in the tire width direction. Furthermore, at least the corrugated surface disposed at outermost sides of both ends of the second sipe portion 42 (portions connecting with the first sipe portion 41) of the second sipe wall faces 421 and 422 are oriented toward an outer side of the blocks 3. Note that examples of such a second sipe portion 42 include the technology described in Japanese Patent No. 3894743.

Additionally, in the configuration of FIG. 14, the second sipe wall faces 421 and 422 have a structure in which a plurality of prism shapes having a block form are connected in the sipe depth direction and the sipe length direction while inclining with respect to the sipe depth direction. In other words, the second sipe wall faces 421 and 422 have a zigzag form in the tread surface. Additionally, the second sipe wall faces 421 and 422 have bent portions in at least two locations in the tire radial direction in the blocks 3 that bend in the tire circumferential direction and are connected in the tire width direction. Moreover, these bent portions have a zigzag form that oscillates in the tire radial direction. Additionally, while in the second sipe wall faces 421 and 422 the oscillation is constant in the tire circumferential direction, an inclination angle in the tire circumferential direction with respect to a normal line direction of the tread surface is configured so as to be smaller at a moiety on the sipe bottom side than at a moiety on the tread surface side; and the oscillation in the tire radial direction of the bent portion is configured so as to be greater at a moiety on the sipe bottom side than at a moiety on the tread surface side. Note that examples of such a second sipe portion 42 include the technology described in Japanese Patent No. 4316452.

Example of Application to Semi-Closed Sipes

Figure 15:
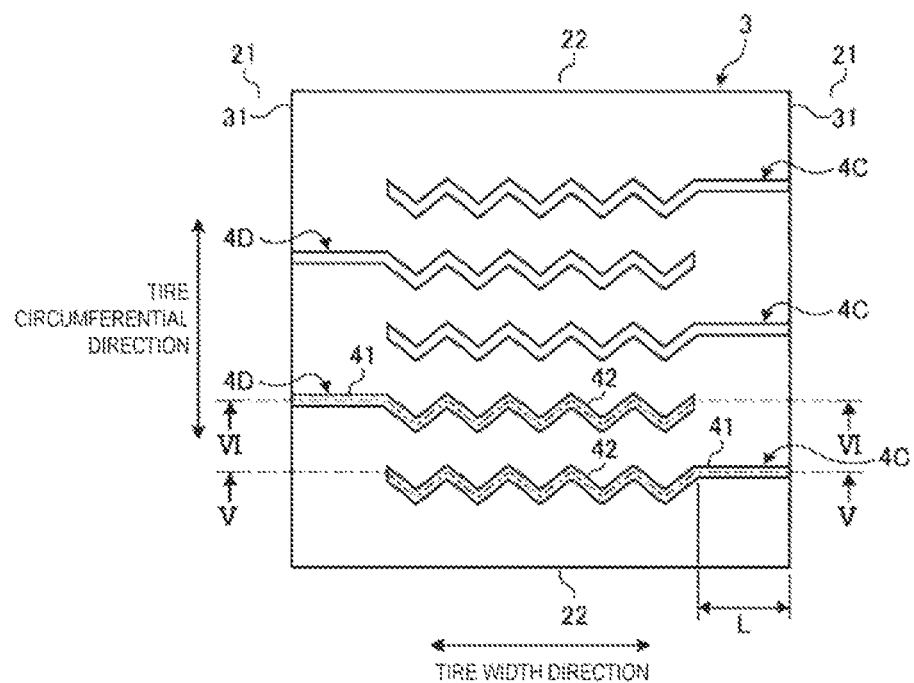
FIG. 15 is an explanatory view illustrating a modified example of the pneumatic tire depicted in FIG. 1.
Figure 16:
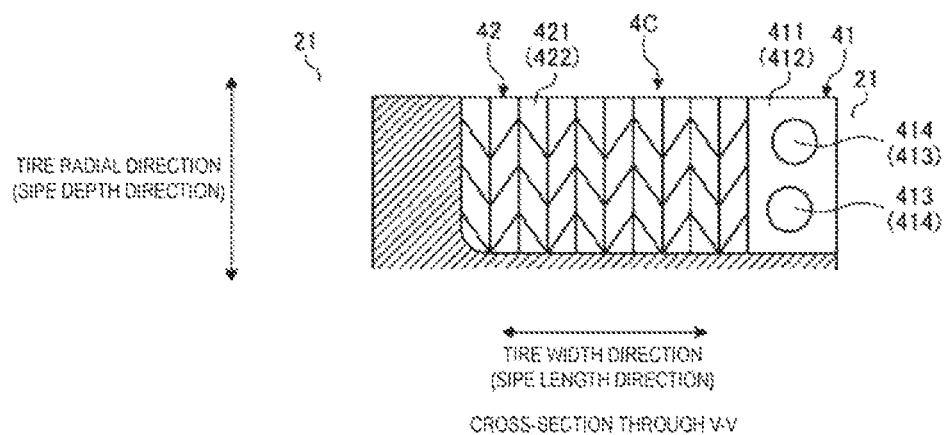
FIG. 16 is an explanatory view illustrating a modified example of the pneumatic tire depicted in FIG. 1.
Figure 17:
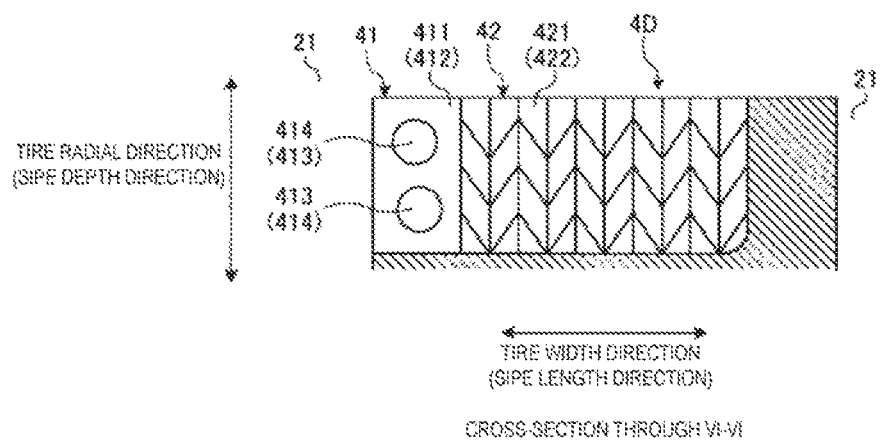
FIG. 17 is an explanatory view illustrating a modified example of the pneumatic tire depicted in FIG. 1.

FIGS. 15 to 17 are explanatory views illustrating modified examples of the pneumatic tire 1 depicted in FIG. 1. These drawings illustrate a case in which a first sipe 4C and a second sipe 4D have a semi-closed structure.

In the configuration of FIG. 15, the first sipe 4C and the second sipe 4D have an open structure, crossing the block 3 in the tire width direction and opening to the left and right circumferential main grooves 21 and 21. However, the present technology is not limited to such a configuration, and may have a structure in which the first sipe 4C and the second sipe 4D have a semi-closed structure. In such a case, opening side end portions of the first sipe 4C and the second sipe 4D are formed by the first sipe portions 41.

For example, in the configurations of FIG. 15 to FIG. 17, the first sipe 4C and the second sipe 4D are formed as a connection of the first sipe portion 41 and the second sipe portion 42 alone, and the third sipe portion 43 is omitted. Therefore, at the first end portion of the first sipe 4C and the second sipe 4D, the first sipe portion 41 opens to the circumferential main groove 21 from the edge portion 31 of the block 3. At the second end portion, the second sipe portion 42 terminates within the block 3.

Effect

As described above, the pneumatic tire 1 includes a plurality of circumferential main grooves 21 extending in the tire circumferential direction, a plurality of lug grooves 22 extending in the tire width direction, and the blocks 3 partitioned by the circumferential main grooves 21 and the lug grooves 22 (see FIG. 2). A single block 3 includes a first sipe 4A and a second sipe 4B extending in the tire width direction and disposed at a predetermined pitch in the tire circumferential direction (see FIG. 3). The first sipe 4A and the second sipe 4B include a first sipe portion 41 that has a linear form when the block 3 is viewed planarly, and a second sipe portion 42 that has a zigzag shape when the block 3 is viewed planarly and that connects to the first sipe portion 41. The first sipe portion 41 includes a pair of sipe wall faces 411 and 412 that face each other and have a linear form when viewed as a cross-section from a direction perpendicular to a sipe length direction, and includes protrusions 413 disposed on the sipe wall face 411 and recesses 414 disposed on the sipe wall face 412 so as to mate with the protrusions 413 (see FIGS. 4 to 7). The first sipe portion 41 of the first sipe 4A opens to one circumferential main groove 21 of the left or right circumferential main grooves 21 and 21 that partition the blocks 3, and the first sipe portion 41 of the second sipe 4B opens to the other circumferential main groove 21 (see FIG. 3).

In such a configuration, when the tire is in contact with the ground, the first sipe portion 41 including the protrusion 413 and the recess 414 collapses easily, while the shallow-bottomed third sipe portion 43 resists collapse (see FIG. 8). Here, the first sipe portion 41 and the third sipe portion 43 are disposed alternately in the tire circumferential direction on the left and right edge portions 31 and 31 of the block 3. Therefore, the water film removing action on icy roads is enhanced. As result, such a configuration is beneficial because the water discharge properties are improved, and performance on ice and performance on snow (steering stability on snow and braking ability on ice) of the tire are improved.

In the pneumatic tire 1, the first sipe 4A and the second sipe 4B each include a third sipe portion 43 that has a linear form when the block 3 is viewed planarly, and that connects to the second sipe portion 42 (see FIG. 3). The first sipe portion 41 opens to one circumferential main groove 21 of the left and right circumferential main grooves 21 and 21 that partition the blocks 3, and the third sipe portion 43 opens to the other circumferential main groove 21. Further, a sipe depth D1 of the first sipe portion 41 and a sipe depth D2 of the third sipe portion 43 have a relationship such that D2/D1≤0.5 (see FIG. 4). In such a configuration, the first sipe portion 41 includes the protrusion 413 and the recess 414, and the sipe depth D2 of the third sipe portion 43 is less than the sipe depth D1 of the first sipe portion 41. As a result, such a configuration is beneficial because a balance in the rigidity of the left and right edge portions 31 and 31 of the block 3 is ensured.

In the pneumatic tire 1, the first sipe 4C and the second sipe 4D have a semi-closed structure in which the first sipe 4C and the second sipe 4D terminate within the block 3 on the second sipe portion 42 side (see FIG. 15). In such a configuration, the first sipe portion 41 includes the protrusion 413 and the recess 414, and terminates within the block 3 on the second sipe portion 42 side. As a result, such a configuration is beneficial because a balance in the rigidity of the left and right edge portions 31 and 31 of the block 3 is ensured.

Further, in the pneumatic tire 1, when the block 3 includes a plurality of sipes formed from the first sipe 4A and the second sipe 4B, at least one of each of the first sipe 4A and the second sipe 4B is included in every four adjacent sipes (see FIG. 3). As a result, the number of continuously disposed adjacent first sipes 4A and the number of continuously disposed adjacent second sipes 4B are made appropriate. Therefore, such a configuration is beneficial because the imbalance in rigidity of the edge portions 31 of the block 3 is corrected.

Also, in the pneumatic tire 1, the number NA of the first sipes 4A and the number NB of the second sipes 4B in the single block 3 satisfy a relationship such that $0.25 \leq NA/NB \leq 0.75$. Thus, the number of the first sipe portions 41 disposed on the left and right edge portions 31 and 31 of the block 3 is balanced. As a result, such a configuration is beneficial because the difference in left and right rigidity of the block 3 is made appropriate.

In the pneumatic tire 1, when the block 3 includes a plurality of sipes extending in the tire width direction and having at least a first end that opens to the circumferential main groove 21, not less than 50% of a total number of the sipes are constituted by the first sipe 4A and the second sipe 4B. Therefore, such a configuration is beneficial because the above-described action (water film removing action on icy roads) of the first sipe 4A and the second sipe 4B is appropriately ensured.

Also, in the pneumatic tire 1, the first sipe portion 41 includes a plurality of sets of the protrusion 413 and the recess 414 arranged in the sipe depth direction (see FIGS. 4 to 6). With such a configuration, the protrusions 413 and the recesses 414 are arranged in a multilevel structure in the sipe depth direction. As a result, such a configuration is beneficial because rigidity of the block 3 in the first sipe portion 41 is appropriately ensured.

Additionally, in the pneumatic tire 1, a height H1 of the protrusion 413 positioned on a road contact surface side of the block 3, and a height H2 of the protrusion 413 positioned on a bottom side of the first sipe portion 41 have a relationship such that H1>H2 (see FIG. 10). With such a configuration, the mating force of the protrusion 413 and the recess 414 on the road contact surface side of the block 3 will be great. Thus, such a configuration is beneficial because block rigidity of the road contact surface side, where collapsing is prone to occur, can be effectively reinforced.

Further, in the pneumatic tire 1, when the first sipe portion 41 includes a plurality of sets of the protrusion 413 and the recess 414, a first face of the sipe wall face 411 of the first sipe portion 41 has at least one of each of the protrusions 413 and the recesses 414 (see FIG. 6). Such a configuration is beneficial because when an external ground contact force acts on either side in the tire circumferential direction, an effect of suppressing the collapse of the block 3 is effectively obtained through the mating of the protrusions 413 and the recesses 414.

Additionally, in the pneumatic tire 1, when the first sipe portion 41 includes the plurality of sets of the protrusion 413 and the recess 414, a first face of the sipe wall face 411 of the first sipe portions 41 includes only the protrusions 413 and the second face of the sipe wall face 412 includes only the recesses 414 (see FIG. 9). Such a configuration is beneficial because the effect of suppressing the collapse of the block 3 with respect to an external ground contact force in a predetermined direction can be effectively enhanced.

Also, in the pneumatic tire 1, the height H (H1 and H2) of the protrusions is within a range of not less than 0.5 mm and not more than 3.0 mm (see FIG. 6 and FIG. 10). Therefore, such a configuration is beneficial because the mating force between the protrusions 413 and the recesses 414 is appropriately ensured.

Additionally, in the pneumatic tire 1, a diameter R of the protrusion 413 is in a range $1 \text{ mm} \leq R \leq 4$ mm (see FIG. 4). Therefore, such a configuration is beneficial because the mating force between the protrusions 413 and the recesses 414 is appropriately ensured.

In the pneumatic tire 1, when the first sipe portion 41 includes a plurality of sets of the protrusion 413 and the recess 414, the average distance value Dd from the road contact surface of the block 3 to the center of gravity of the protrusion 413 and the sipe depth D1 of the first sipe portion 41 have a relationship such that $0.5 \leq Dd/D1$ (FIG. 4 and FIG. 5). As a result, the distance Dd of the protrusion 413 with respect to the road contact surface of the block 3 is made appropriate. Therefore, such a configuration is beneficial because the rigidity of the edge portions 31 of the block 3 in the middle stage of wear is appropriately ensured.

With the pneumatic tire 1, a length L of the first sipe portion 41 in the tire width direction is in a range $1 \text{ mm} \leq L \leq 5$ mm (see FIG. 3). Therefore, such a configuration is beneficial because the water discharge properties of the first sipe portion 41 are appropriately displayed.

Further, in the pneumatic tire 1, a disposal pitch P between the first sipe 4A and the second sipe 4B (see FIG. 3) and a height Hb (not illustrated in the drawings) of the block 3 have a relationship such that $0.3 \leq P/Hb \leq 1.0$. Therefore, such a configuration is beneficial because rigidity of the block 3 is ensured and also the water film removing action by the first sipe 4A and the second sipe 4B is appropriately obtained.

Additionally, in the pneumatic tire 1, a sipe area Sa of the first sipe portion 41 and a sum Sp of a disposal area of the protrusions 413 and recesses 414 in the first sipe portion 41 have a relationship such that $0.2 \leq Sp/Sa \leq 0.7$ (see FIGS. 4 and 5). Therefore, such a configuration is beneficial because the production of the edge form of the sipe molding die is facilitated while maintaining the functionality of the protrusion 413 and the recess 414.

Further, in the pneumatic tire 1, the first sipe portion 41 includes a pair of sipe wall faces 411 and 412 that have a linear form when viewed as a cross-section from a direction perpendicular to the sipe length direction, and includes the protrusions 413 and the recesses 414 disposed on the sipe wall faces 411 and 412 (see FIGS. 4 to 6). Therefore, such a configuration is beneficial because the water discharge properties of the first sipe portion 41 are appropriately displayed.

Further, in the pneumatic tire 1, the second sipe portion 42 has a pair of second sipe wall faces 412 and 422 that have a form bent in the sipe width direction when viewed as a cross-section from a direction perpendicular to the sipe length direction, and are mutually opposing so as to mate (see FIG. 5 and FIG. 7). Therefore, such a configuration is beneficial because the mating force of the second sipe portion 42 is increased and thus the rigidity of the block 3 is reinforced.

The pneumatic tire 1 is applied to a studless tire.

EXAMPLES

Performance Tests

Figure 19:
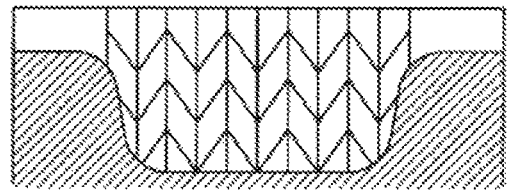
FIG. 19 is an explanatory view illustrating a pneumatic tire of a conventional example.
Figure 20:
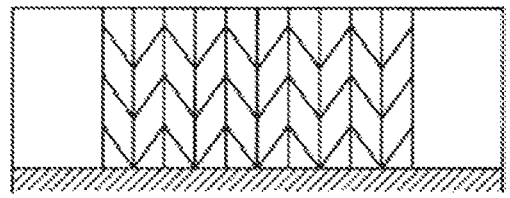
FIG. 20 is an explanatory view illustrating a pneumatic tire of Comparative Example 1.

FIGS. 18a-18b include a table showing the results of performance testing of pneumatic tires according to the embodiments of the present technology. FIG. 19 is an explanatory drawing illustrating a pneumatic tire of a conventional example. FIG. 20 is an explanatory view illustrating a pneumatic tire of Comparative Example 1.

In the performance testing, a plurality of pneumatic tires were evaluated under different conditions for (1) steering stability on snow and (2) braking ability on ice (see FIGS. 18a-18b). In the performance tests, pneumatic tires with a tire size of 195/65R15 were assembled on a rim having a rim size of 15×6JJ; and an inner pressure of 210 kPa and a maximum load defined by JATMA were applied to these pneumatic tires.

In the evaluation of (1) steering stability on snow, the test vehicle on which the pneumatic tires were mounted was driven on a predetermined icy and snowy road, and a test driver performed a sensory evaluation of lane changing performance and cornering performance. In this evaluation, the index value of the pneumatic tire of the Conventional Example was set as the standard score (100), and higher scores were preferable.

In the evaluation testing of (2) braking ability on ice, the test vehicle on which the pneumatic tires were mounted was driven on a frozen road. Evaluation was performed by measuring the braking distance from a traveling speed of 40 km/h. In this evaluation, the index value of the pneumatic tire of the Conventional Example was set as the standard score (100), and higher scores were preferable.

The pneumatic tires 1 of Working Example 1 had the configuration illustrated in FIGS. 1 to 7. The pneumatic tires 1 of Working Examples 2 to 12 are modified examples of the pneumatic tire of Working Example 1. Further, in the pneumatic tires 1 of Working Examples 1 to 12, the height Hb of the blocks 3 is constant at Hb=8.9 mm and the sipe depth D1 of the first sipe portions 41 is constant at D1=7.0 mm Further, the radius R of the protrusions 413 is R=10 mm and a ratio Sp/Sa of disposal areas is Sp/Sa=0.3.

In the pneumatic tire of the Conventional Example, in the configurations of FIGS. 1 to 3, all the sipes have the sipe structure depicted in FIG. 19. Also, in the pneumatic tire of the Conventional Example, the protrusions 413 and the recesses 414 of the first sipe portion 41 are omitted and the first sipe portions 41 has a raised bottom as with the third sipe portion 43. Further, the depth of the left and right planar sipe portions (depth corresponding to D2 in FIG. 4) is 2 mm.

In the pneumatic tire of the Comparative Example 1, in the configurations of FIGS. 1 to 3, all the sipes have the sipe structure depicted in FIG. 20. Further, the depth of the left and right planar sipe portions (depth corresponding to D1 in FIG. 4) is 7.0 mm.

Further, in the pneumatic tire of Comparative Example 2, in the configurations of FIGS. 1 to 7, the protrusions 413 and the recesses 414 of the first sipe portion 41 have been omitted.

As is clear from the test results, with the pneumatic tires 1 of Working Examples 1 to 12, steering stability on snow and braking ability on ice of the tire are improved.

The invention claimed is:

1. A pneumatic tire comprising: a plurality of circumferential main grooves extending in a tire circumferential direction, a plurality of lug grooves extending in a tire width direction, and blocks partitioned by the plurality of circumferential main grooves and the plurality of lug grooves, wherein the blocks include a first sipe and a second sipe, each extending in the tire width direction and disposed at a predetermined pitch in the tire circumferential direction;

the first sipe and the second sipe each include a first sipe portion having a linear form when the block is viewed planarly, a second sipe portion having a zigzag shape when the block is viewed planarly and that connects to the first sipe portion, and a third sipe portion having a linear form when the block is viewed planarly and that connects to the second sipe portion;

the first sipe portion includes a pair of first sipe wall faces that face each other and have a linear form when viewed as a cross-section from a direction perpendicular to a sipe length direction, and includes a protrusion disposed on a first face of the first sipe wall faces and a recess disposed on a second face of the first sipe wall faces so as to mate with the protrusion;

the first sipe portion of the first sipe and the third sipe portion of the second sipe open to one of the circumferential main grooves of the left and right circumferential main grooves that partition the blocks, and the third sipe portion of the first sipe and the first sipe portion of the second sipe open to the other circumferential main groove;

a sipe depth $D1$ of the first sipe portion of the first and second sipes and a sipe depth $D2$ of the third sipe portion of the first and second sipes have a relationship such that $D2/D1 \leq 0.5$;

when viewed as a cross-section from a direction perpendicular to the sipe length direction, the second sipe portion has a pair of second sipe wall faces that have a form bent in a sipe width direction, and are mutually opposing so as to mate; and when viewed as a cross-section from a direction perpendicular to the sipe length direction, the third sipe portion has a pair of third sipe wall faces that have a linear form, and do not include a protrusion and a recess.

2. The pneumatic tire according to claim 1, wherein, when the blocks include a plurality of sipes constituted by the first sipe and the second sipe, at least one of each of the first sipe and the second sipe is included in four adjacent sipes.

3. The pneumatic tire according to claim 1, wherein a number of sipes NA of the first sipe and a number of sipes NB of the second sipe in one of the blocks have a relationship such that $0.25 \leq NA/NB \leq 0.75$.

4. The pneumatic tire according to claim 1, wherein, when the blocks include a plurality of sipes extending in the tire width direction and having at least a first end that opens to the circumferential main grooves, not less than 50% of a total number of the sipes are constituted by the first sipe and the second sipe.

5. The pneumatic tire according to claim 1, wherein the first sipe portion includes a plurality of pairs of the protrusion and the recess, arranged in a sipe depth direction.

6. The pneumatic tire according to claim 5, wherein a height $H1$ of the protrusion positioned on a road contact surface side of the blocks, and a height $H2$ of the protrusion positioned on a bottom side of the first sipe portion have a relationship such that H1≤H2.

7. The pneumatic tire according to claim 1, wherein, when the first sipe portion includes a plurality of pairs of the protrusion and the recess, a first face of the sipe wall faces of the first sipe portion has at least one of each of the protrusion and the recess.

8. The pneumatic tire according to claim 1, wherein, when the first sipe portion includes a plurality of pairs of the protrusion and the recess, the first face of the sipe wall faces of the first sipe portion has only the protrusion and a second face of the sipe wall face has only the recess.

9. The pneumatic tire according to claim 1, wherein a height of the protrusion is within a range of not less than 0.5 mm and not more than 3.0 mm.

10. The pneumatic tire according to claim 1, wherein a diameter R of the protrusion is within a range 1 mm≤R≤4 mm.

11. The pneumatic tire according to claim 1, wherein, when the first sipe portion includes a plurality of pairs of the protrusion and the recess, an average distance value Dd from the road contact surface of the blocks to a center of gravity of the protrusion, and a sipe depth D1 of the first sipe portion have a relationship such that 0.5≤Dd/D1.

12. The pneumatic tire according to claim 1, wherein a length L of the first sipe portion in the tire width direction is within a range 1 mm≤L≤5 mm.

13. The pneumatic tire according to claim 1, wherein a disposal pitch P of the first sipe and the second sipe, and a height Hb of the blocks have a relationship such that 0.3≤P/Hb≤1.0.

14. The pneumatic tire according to claim 1, wherein a sipe area Sa of the first sipe portion, and a sum Sp of a disposal area of the protrusion in the first sipe portion have a relationship such that 0.2≤Sp/Sa≤0.7.

15. The pneumatic tire according to claim 1, wherein, when viewed as a cross-section from a direction perpendicular to the sipe length direction, the first sipe portion includes a pair of sipe wall faces having a linear form, and the protrusion and the recess disposed on the pair of sipe wall faces.

16. The pneumatic tire according to claim 1, wherein the pneumatic tire is a studless tire.

17. The pneumatic tire according to claim 1, wherein the protrusion has a form in which a top portion on a protruding side is a hemisphere, a semi-ellipsoid, or a truncated cone; and a bottom portion is a cylinder.

18. The pneumatic tire according to claim 1, wherein the second sipe wall faces have a structure in which a plurality of prism shapes having a block form are connected in the sipe depth direction and the sipe length direction while inclining with respect to the sipe depth direction.

* * * * *